3,358,178
METAL-POROUS BODY HAVING PORES FILLED
WITH BARIUM SCANDATE
Avraam Iljich Figner, ulitsa Dmitrova 51/53, Apt. 7,
Anna Iosifovna Soloveichik, 3rd Kozhukhovskaja ulitsa
19, Apt. 4, and Irina Vasiljevna Judinskaja, Izmailov-
skoje Chaussee 57, Apt. 114, all of Moscow, U.S.S.R.
Filed Oct. 26, 1964, Ser. No. 406,374
3 Claims. (Cl. 313—346)

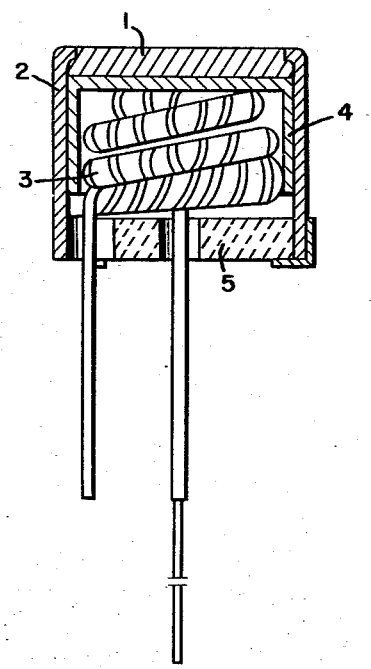

ABSTRACT OF THE DISCLOSURE

A metal-porous cathode with a device for indirect heating and with a refractory metal-porous body whose pores are filled with barium scandate, $3BaO.2Sc_2O_3$, as an emission-active substance.

---

The present invention relates to metal-porous cathodes pressed or impregnated, indirectly heated and with a refractory metal-porous body.

There are known pressed, baked or impregnated metal-porous cathodes which are metal-porous bodies made of refractory metal whose pores are filled with an emission-active substance. Barium aluminate, barium-calcium aluminate, barium tungstate, barium-calcium tungstate, or barium calcium alumino-silicate may be used as an active substance. The main disadvantages of the abovesaid cathodes are instability of their emission-active material emitter) under long storage conditions, its insufficent thermal stability and hence, instability of the emission characteristics.

Therefore, the cathodes with the barium tungstate as a basis require a third component to be introduced as an additional activator, which complicates the course of reactions in the cathode and increases the instability of thet emission characteristics.

Though the best of the aforesaid cathodes is one made of barium-calcium alumino-silicate, it is not completely free from said disadvantage.

An object of the present invention is to provide a metal-porous cathode (with a refractory metal-porous body) which is free from the disadvantages mentioned above.

Another object of the invention is to provide a durable metal-porous cathode for ultra-high-frequency instruments, gas discharge instruments and special cathode-ray tubes.

In accordance with the above mentioned and other objects of the invention, the cathode comprises a metal-porous body made of refractory metal (e.g. tungsten, molybdenum, tantalum, rhenium, niobium, hafnium, metals of the platinum group or their alloys and mixtures, whose pores are filled with the emission-active material—barium scandate $3BaO.2Sc_2O_3$ in an amount of 5–30% of the total weight of an emission-active material and refractory metal.

Other objects and advantages of the invention will become apparent from the following detailed description and accompanying drawing, in which one of the possible embodiments of the proposed invention is shown in axial section.

Metal-porous body 1 with emission-active material filling the pores is pressed into molybdenum body 2 and separated from heater 3 by underlayer 4 made, for example, of molybdenum. Heater 3 is supported and screened by ceramic insulator 5. The emission-active substance of the metal-porous cathode is barium scandate $3BaO.2Sc_2O_3$. Said compound, being first synthesized, was conventionally named barium scandate by analogy with the aluminate and the other barium dioxides.

The above mentioned compound is obtained by sintering in the air for 10 hours a mixture of powders comprising barium carbonate and scandium oxide taken in a molar ratio 3:2 calculated for barium oxide and scandium oxide. The sintering temperature was maintained within 1200–1300° C. After sintering, the substance was thoroughly crushed in a jasper (agate) mortar. Barium peroxide or other barium compounds which decompose on heating into barium oxide can be used as the raw material instead of barium carbonate. One of refractory metals (e.g. tungsten) or alloys and mixtures thereof can be used as a metal for baked porous body 1 just as in the known pressed or impregnated cathodes. The process of manufacturing the proposed metal-porous cathodes envisages the use of the new compound—barium scandate, $3BaO.2Sc_2O_3$ as an emission-active material.

Experiments confirm the following advantages of the proposed cathode as compared with the known metal-porous cathodes: barium scandate is extremely stable at a prolonged storage in the air even in the case of the air humidity being equal to that of saturated steam at 18–20° C. Under the same conditions, barium aluminates and tungstates, as is well known, rapidly decompose forming emission-passive equimolar compounds and carbonates or barium hydroxides.

Barium scandate is also of high thermal stability and does not decompose at temperatures up to 2000° C., which makes it advantageous as compared to barium tantalates.

In contrast to metal-porous cathodes made on the basis of barium aluminates or tungstates, the scandate cathodes do not require a preliminary heating at 1800–2000° C.

Scandate cathodes in contradistinction to tungstate or tantalate cathodes do not require additional introduction of activators, e.g. aluminum which increases their reproducibility because practically it is very difficult to distribute small amounts of substance of activator additives in the cathode material.

Scandate cathodes can be easily activated without activation agents and considerable overheating of the cathode.

When carrying out experiments it was determined that the cathodes reliably ensure a current density of 1.5–4 a./cm.$^2$ at 1000–1100° C. in the space charge mode for several thousands of hours.

While the present invention is described in connection with a preferred embodiment, it is to be understood that other changes and modifications which will now appear to those skilled in the art, may be made without departing from the spirit and scope of the invention.

These changes and modifications are considered to be falling within the spirit and scope of the invention if defined by the appended claims.

What is claimed is:
1. A metal-porous cathode with a device for indirect heating and with a refractory metal-porous body whose pores are filled with the emission-active substance, barium scandate, $3BaO.2Sc_2O_3$.
2. A metal-porous cathode with a device for indirect heating and with a refractory metal-porous body whose pores are filled with the emission-active substance, barium scandate, $3BaO.2Sc_2O_3$ taken in an amount of 5–30% of the total weight of the emission-active substance and refractory metal.

3. A metal-porous cathode with a device for indirect heating and with a refractory metal-porous body made of a refractory metal selected from the group consisting of tungsten, molybdenum, tantalum, niobium, rhenium, hafnium, platinum group, and mixtures and alloys thereof, the pores of said porous body being filled with an emission-active substance, barium scandate, $3BaO.Sc_2O_3$ taken in an amount of 5–30% of the total weight of the emission-active substance and one of said refractory metals or their mixtures and alloys.

No references cited.

JOHN W. HUCKERT, *Primary Examiner.*

A. J. JAMES, *Assistant Examiner.*